(12) United States Patent
Nagaya et al.

(10) Patent No.: US 12,522,183 B2
(45) Date of Patent: Jan. 13, 2026

(54) VEHICLE DRIVE DEVICE

(71) Applicant: AISIN CORPORATION, Aichi (JP)

(72) Inventors: Ryosuke Nagaya, Kariya (JP); Tadaaki Watanabe, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/871,649

(22) PCT Filed: Sep. 15, 2023

(86) PCT No.: PCT/JP2023/033691
§ 371 (c)(1),
(2) Date: Dec. 4, 2024

(87) PCT Pub. No.: WO2024/070765
PCT Pub. Date: Apr. 4, 2024

(65) Prior Publication Data
US 2025/0353474 A1    Nov. 20, 2025

(30) Foreign Application Priority Data

Sep. 28, 2022   (JP) ................... 2022-154874

(51) Int. Cl.
*F16H 63/34* (2006.01)
*B60L 15/20* (2006.01)
*B60T 1/00* (2006.01)

(52) U.S. Cl.
CPC .............. *B60T 1/005* (2013.01); *B60L 15/20* (2013.01); *F16H 63/3441* (2013.01); *F16H 63/3475* (2013.01)

(58) Field of Classification Search
CPC ...... B60T 1/005; B60L 15/20; F16H 63/3441; F16H 63/3475
See application file for complete search history.

(56) References Cited

U.S. PATENT DOCUMENTS

| | | | | |
|---|---|---|---|---|
| 5,807,205 A | * | 9/1998 | Odaka | F16H 63/483 477/901 |
| 2010/0312424 A1 | * | 12/2010 | Yasui | F16H 63/3466 701/31.4 |
| 2018/0209534 A1 | * | 7/2018 | Takeuchi | F16H 59/54 |

FOREIGN PATENT DOCUMENTS

| JP | 2003-264908 A | | 9/2003 |
|---|---|---|---|
| JP | 2016161058 A | * | 9/2016 |

* cited by examiner

*Primary Examiner* — Lori Wu
(74) *Attorney, Agent, or Firm* — Oliff PLC

(57) ABSTRACT

When there is backlash in a rotation direction between a lock member at a lock position and a first rotary member, a rotational position of a target rotary member, the rotational position being detected in a locked state of a parking lock mechanism by a rotational position sensor, is defined as a detected rotational position, and a rotational position of the target rotary member in a case where it is assumed that there is not the backlash in the locked state of the parking lock mechanism is defined as a theoretical lock position, a control device executes torque direction determination processing that determines a wheel torque direction, on the basis of a direction of deviation of the detected rotational position from the theoretical lock position due to the backlash.

9 Claims, 6 Drawing Sheets

VEHICLE DRIVE DEVICE

TECHNICAL FIELD

The present disclosure relates to a vehicle drive device including a rotating electrical machine that functions as a driving force source of wheels, and a parking lock mechanism that selectively restricts rotation of a rotary member that rotates in conjunction with the wheels.

BACKGROUND ART

An example of such a vehicle drive device is disclosed in Patent Literature 1 below. Hereinafter, in description of the background art, reference signs in Patent Literature 1 are cited in parentheses.

In a vehicle drive device (10) disclosed in Patent Literature 1, a parking lock mechanism (78) includes a parking lock gear (76) disposed on a power transmission path connecting a rotating electrical machine (12) and wheels (68, 74), a parking pawl (80) that restricts rotation of the parking lock gear, and a drive device (82) that drives the parking pawl (refer to FIG. 1 in Patent Literature 1).

CITATIONS LIST

Patent Literature

Patent Literature 1: JP 2003-264908 A

SUMMARY OF DISCLOSURE

Technical Problems

Meanwhile, in a case where a vehicle is stopped on an inclined road surface, torque is transmitted from the wheels (68, 74) to the parking lock gear (76) by weight of the vehicle, by which a load acts on an engagement portion between the parking lock gear (76) and the parking pawl (80). As a result, the driving force of the drive device (82) may not be able to disengage the parking pawl (80) from the parking lock gear (76).

Patent Literature 1 discloses that, in the above case, torque of the rotating electrical machine (12) is controlled so as to reduce the load acting on the engagement portion between the parking lock gear (76) and the parking pawl (80).

However, Patent Literature 1 does not disclose a point of determining a direction of the load acting on the engagement portion between the parking lock gear (76) and the parking pawl (80). Therefore, in the above-described vehicle drive device (10), it has been difficult to appropriately control the torque of the rotating electrical machine (12) so as to reduce the load acting on the engagement portion between the parking lock gear (76) and the parking pawl (80).

Therefore, it is desired to implement a vehicle drive device capable of appropriately controlling torque of a rotating electrical machine in a case of unlocking a parking lock mechanism.

Solutions to Problems

In view of the above, a characteristic configuration of a vehicle drive device is that
the vehicle drive device includes a rotating electrical machine that functions as a driving force source for wheels,
a parking lock mechanism that selectively restricts rotation of a first rotary member that rotates in conjunction with the wheels,
a rotational position sensor that detects a rotational position of a target rotary member that is either a second rotary member that rotates in conjunction with the wheels and is disposed on the wheels side with respect to the first rotary member on a power transmission path connecting the rotating electrical machine and the wheels, or the first rotary member, and
a control device that acquires a detected value from the rotational position sensor and controls the rotating electrical machine and the parking lock mechanism, in which
the parking lock mechanism includes a lock member that is movable to a lock position at which the lock member is engaged with the first rotary member to restrict rotation of the first rotary member, and to an unlock position at which the lock member is separated from the first rotary member to allow rotation of the first rotary member, and a drive device that drives the lock member,
there is backlash in a rotation direction between the lock member at the lock position and the first rotary member,
a state of the parking lock mechanism when the lock member is at the lock position is defined as a locked state, a rotational position of the target rotary member, the rotational position being detected in the locked state by the rotational position sensor, is defined as a detected rotational position, and a rotational position of the target rotary member in a case where it is assumed that there is not the backlash in the locked state is defined as a theoretical lock position, and
the control device executes torque direction determination processing that determines a wheel torque direction that is a direction of torque transmitted from the wheels to the first rotary member, on the basis of a direction of deviation of the detected rotational position from the theoretical lock position due to the backlash.

According to the characteristic configuration, in the torque direction determination processing, the wheel torque direction is determined on the basis of the direction in which the detected rotational position is deviated from the theoretical lock position due to the backlash. As a result, torque in a direction to weaken engagement force between the lock member and the first rotary member can be appropriately output to the rotating electrical machine. Therefore, it is possible to appropriately control torque of the rotating electrical machine in a case of unlocking the parking lock mechanism. In this way, even in a case where driving force of the drive device cannot move the lock member from the lock position to the unlock position side, engagement force between the lock member and the first rotary member can be weakened by using the torque of the rotating electrical machine, and thus the driving force of the drive device can unlock the parking lock mechanism.

Furthermore, according to the characteristic configuration, it is possible to eliminate need for various sensors, such as an inclination angle sensor, for determining the wheel torque direction. Therefore, it is easy to simplify and reduce costs for a configuration of the vehicle drive device.

DESCRIPTION OF EMBODIMENTS

Figure 1:
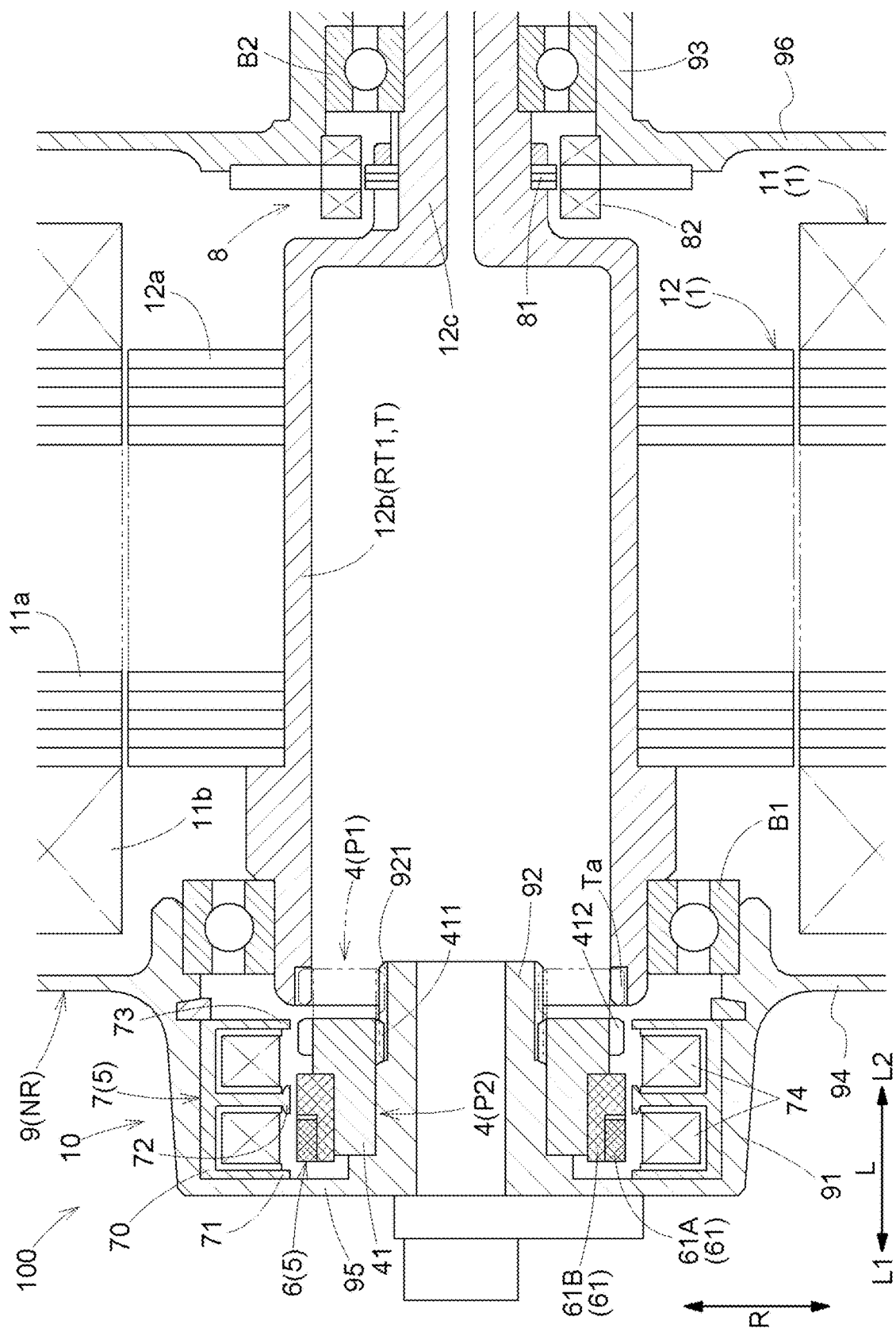
FIG. 1 is a cross-sectional view showing a part of a vehicle drive device according to an embodiment.

Hereinafter, a vehicle drive device 100 according to an embodiment will be described with reference to the drawings. As shown in FIG. 1, the vehicle drive device 100 includes a rotating electrical machine 1, a rotational position sensor 8, and a parking lock mechanism 10.

The rotating electrical machine 1 functions as a driving force source for wheels W (refer to FIG. 2) included in a vehicle. The rotating electrical machine 1 has a function as a motor (electric motor) that receives electric power supply to generate power, and a function as a generator (generator) that receives supply of power to generates electric power. Specifically, the rotating electrical machine 1 is electrically coupled to a power storage device (not shown) such as a battery and a capacitor. Then, the rotating electrical machine 1 is powered by electric power stored in the power storage device to generate driving force. Furthermore, the rotating electrical machine 1 generates electric power with the driving force transmitted from the wheels W side and charges the power storage device.

The rotating electrical machine 1 includes a stator 11 and a rotor 12. The stator 11 includes a stator core 11a having a cylindrical shape. The stator core 11a is fixed to a non-rotary member NR. The rotor 12 includes a rotor core 12a having a cylindrical shape. The rotor core 12a is rotatably supported with respect to the stator core 11a. In the present embodiment, the rotor 12 further includes a rotor shaft 12b coupled to the rotor core 12a so as to rotate integrally with the rotor core 12a.

In the following description, a direction along a rotation axis of the rotor 12 is referred to as an "axial direction L". Then, one side in the axial direction L is referred to as an "axial direction first side L1", and another side in the axial direction L is referred to as an "axial direction second side L2". Furthermore, a direction orthogonal to the axial direction L is referred to as a "radial direction R". The radial direction R is defined with reference to each rotation axis of a rotary member such as the rotor 12. Note that, when it is not necessary to distinguish which rotation axis is used as the reference or when it is clear which rotation axis is used as the reference, the direction may be simply referred to as the "radial direction R".

In the present embodiment, the rotor shaft 12b is formed in a tubular shape having an axis along the axial direction L. Then, the rotor shaft 12b is disposed so as to protrude from the rotor core 12a toward each of the axial direction first side L1 and the axial direction second side L2.

In the present embodiment, the rotating electrical machine 1 is an inner rotor type rotating electrical machine. Therefore, the rotor core 12a is disposed inside of the stator core 11a in the radial direction R. Furthermore, the rotor shaft 12b is disposed inside of the rotor core 12a in the radial direction R.

Furthermore, in the present embodiment, the rotating electrical machine 1 is a revolving-field type rotating electrical machine. Therefore, a stator coil is wound around the stator core 11a. In the present embodiment, the stator coil is wound around the stator core 11a such that coil end portions 11b protruding on the axial direction first side L1 and the axial direction second side L2 from the stator core 11a are formed. Furthermore, although not shown, the rotor core 12a is provided with a permanent magnet.

The rotational position sensor 8 is a sensor for detecting a rotational position of a target rotary member T that is either a first rotary member RT1 or a second rotary member RT2. In the present embodiment, the target rotary member T is the first rotary member RT1. Then, the first rotary member RT1 is the rotor shaft 12b.

Figure 2:
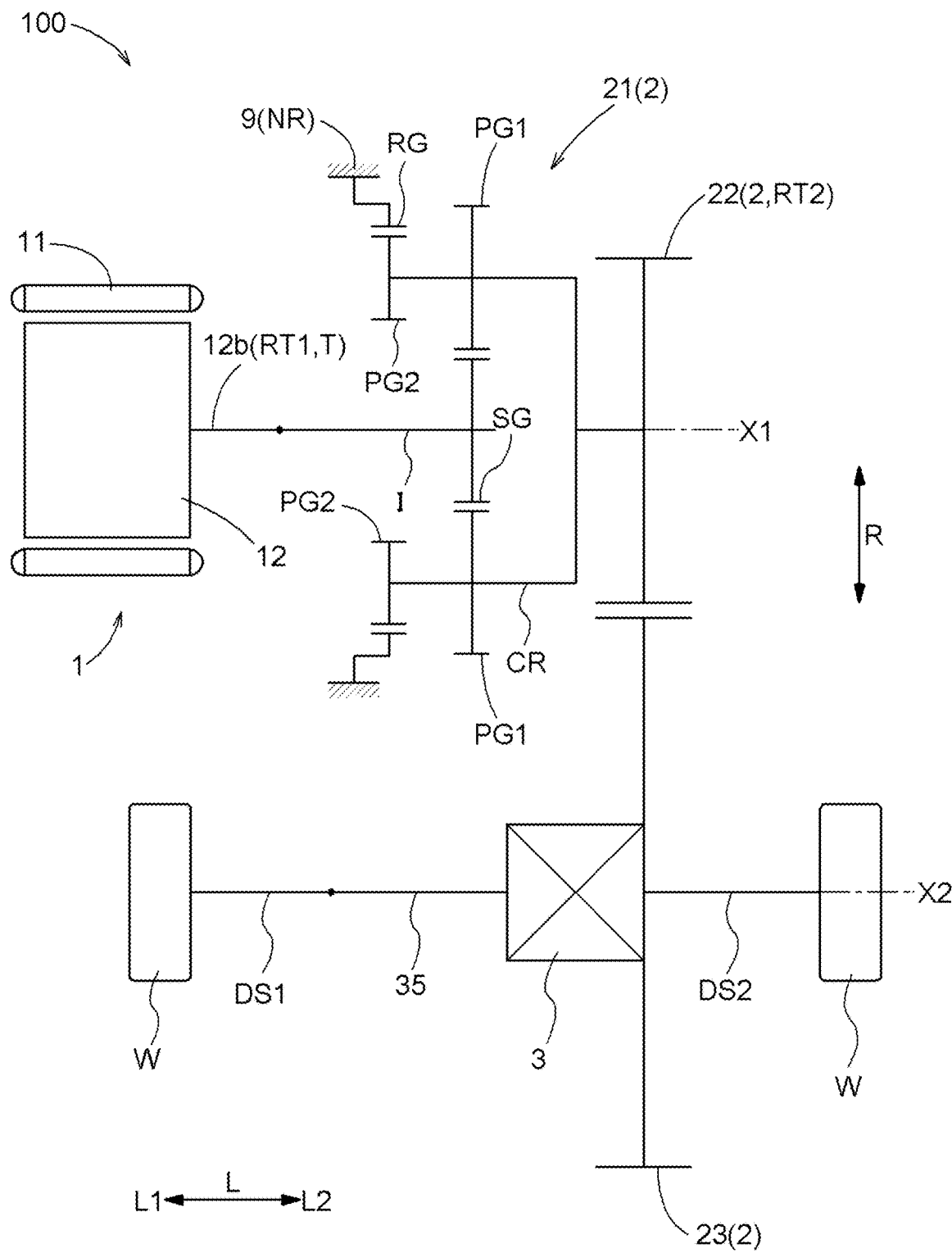
FIG. 2 is a skeleton diagram of the vehicle drive device according to the embodiment.

Each of the first rotary member RT1 and the second rotary member RT2 is a rotary member that rotates in conjunction with the wheels W (refer to FIG. 2). The second rotary member RT2 is disposed on the wheels W side with respect to the first rotary member RT1 on a power transmission path connecting the rotating electrical machine 1 and the wheels W.

The parking lock mechanism 10 selectively restricts rotation of the first rotary member RT1. Note that a detailed configuration of the parking lock mechanism 10 will be described later.

As shown in FIG. 2, in the present embodiment, the vehicle drive device 100 further includes a power transmission mechanism 2, a differential gear mechanism 3, and a case 9.

The power transmission mechanism 2 transmits rotation of the rotor 12 to the differential gear mechanism 3. In the present embodiment, the power transmission mechanism 2 includes a planetary gear mechanism 21, a first gear 22, and a second gear 23. In the present embodiment, the planetary gear mechanism 21 and the first gear 22 are disposed on a first axis X1 that is the rotation axis of the rotor 12. Then, the second gear 23 is disposed on a second axis X2 different from the first axis X1.

The planetary gear mechanism 21 is configured so as to decelerate the rotation of the rotor 12 and transmit the rotation to the first gear 22. The planetary gear mechanism 21 includes a sun gear SG, a carrier CR, and ring gears RG.

The sun gear SG is coupled to the rotor 12 so as to rotate integrally with the rotor 12. That is, the sun gear SG is an input element of the planetary gear mechanism 21. In the present embodiment, the sun gear SG is coupled to the rotor shaft 12b via an input shaft I so as to rotate integrally with the rotor shaft 12b. The input shaft I is formed so as to extend along the axial direction L. In the present embodiment, the input shaft I is formed so as to extend from the sun gear SG to the axial direction first side L1.

The carrier CR rotatably supports first pinion gears PG1 and second pinion gears PG2 that rotate integrally with each other. Each of the first pinion gears PG1 and the second pinion gears PG2 rotates (rotates) about its own axis and rotates (revolves) about the sun gear SG, together with the carrier CR. A plurality of the first pinion gears PG1 and a plurality of the second pinion gears PG2 are provided at intervals from one another along a revolution trajectory of own.

The first pinion gears PG1 mesh with the sun gear SG. The second pinion gears PG2 mesh with the ring gears RG. The second pinion gears PG2 are formed to have a diameter smaller than a diameter of the first pinion gears PG1. In the present embodiment, the second pinion gears PG2 are disposed on the axial direction first side L1 with respect to the first pinion gears PG1.

The carrier CR is coupled to the first gear 22 so as to rotate integrally with the first gear 22. That is, the carrier CR is an output element of the planetary gear mechanism 21. In the present embodiment, the first gear 22 is disposed on the axial direction second side L2 with respect to the planetary gear mechanism 21. Note that, in the present embodiment, the first gear 22 is the second rotary member RT2.

The ring gears RG are fixed to the non-rotary member NR. In the present embodiment, the ring gears RG are fixed to the case 9 as the non-rotary member NR.

The first gear 22 and the second gear 23 mesh with each other. In the present embodiment, the second gear 23 is formed to have a diameter larger than a diameter of the first gear 22. Therefore, in the present embodiment, rotation of the carrier CR of the planetary gear mechanism 21 is decelerated between the first gear 22 and the second gear 23 and transmitted to the differential gear mechanism 3.

The differential gear mechanism 3 distributes the rotation transmitted from the power transmission mechanism 2 to a pair of the wheels W. In the present embodiment, the differential gear mechanism 3 is disposed on the second axis X2.

In the present embodiment, the differential gear mechanism 3 is a bevel-gear type differential gear mechanism. Specifically, the differential gear mechanism 3 includes a pair of pinion gears, a first side gear and a second side gear that mesh with the pair of pinion gears, and a differential case housing these gears.

In the present embodiment, the differential case is coupled to the second gear 23 so as to rotate integrally with the second gear 23. Furthermore, the differential case is coupled to a pinion shaft, which rotatably supports the pair of pinion gears, so as to rotate integrally with the pinion shaft. In the present embodiment, the first side gear is coupled, via a transmission shaft 35 extending along the axial direction L, to a first drive shaft DS1, which is drivingly coupled to a wheel W on the axial direction first side L1, so as to rotate integrally with a first drive shaft DS1. Furthermore, the second side gear is coupled to a second drive shaft DS2, which is drivingly coupled to a wheel W on the axial direction second side L2, so as to rotate integrally with a second drive shaft DS2.

The case 9 houses the rotating electrical machine 1, the power transmission mechanism 2, the differential gear mechanism 3, and the parking lock mechanism 10. As shown in FIG. 1, in the present embodiment, the case 9 includes a first tubular portion 91, a second tubular portion 92, a third tubular portion 93, a first side-wall portion 94, a second side-wall portion 95, and a third side-wall portion 96.

Each of the first tubular portion 91 and the second tubular portion 92 is formed in a tubular shape concentric with the rotor 12. In the present embodiment, the first tubular portion 91 is disposed outside of a portion of the rotor shaft 12b in the radial direction R, the portion protruding from the rotor core 12a toward the axial direction first side L1. Furthermore, the second tubular portion 92 is disposed inside of a portion of the rotor shaft 12b in the radial direction R, the portion protruding from the rotor core 12a toward the axial direction first side L1. In the present embodiment, the rotor shaft 12b is rotatably supported with respect to the case 9 via a first rotor bearing B1 disposed between the rotor shaft 12b and the first tubular portion 91 in the radial direction R.

The first side-wall portion 94 is formed so as to extend outward in the radial direction R from the first tubular portion 91. The first side-wall portion 94 is disposed so as to cover the axial direction first side L1 of the rotating electrical machine 1. The second side-wall portion 95 is formed so as to extend inward in the radial direction R from the first tubular portion 91. The second side-wall portion 95 is disposed on the axial direction first side L1 with respect to the first side-wall portion 94. In the present embodiment, the second side-wall portion 95 is coupled to an end of the first tubular portion 91 on the axial direction first side L1 so as to cover the first tubular portion 91 from the axial direction first side L1. Furthermore, in the present embodiment, the second tubular portion 92 is formed so as to extend from the second side-wall portion 95 toward the axial direction second side L2.

The third tubular portion 93 is formed in a tubular shape concentric with the rotor 12. In the present embodiment, a portion of the rotor shaft 12b, the portion protruding from the rotor core 12a toward the axial direction second side L2, has a small-diameter portion 12c formed to have a diameter smaller than a diameter of a portion of the rotor shaft 12b, the portion being coupled to the rotor core 12a. Then, the third tubular portion 93 is disposed outside the small-diameter portion 12c of the rotor shaft 12b in the radial direction R. In the present embodiment, the rotor shaft 12b is rotatably supported with respect to the case 9 via a second rotor bearing B2 disposed between the small-diameter portion 12c and the third tubular portion 93 in the radial direction R.

The third side-wall portion 96 is formed so as to extend outward in the radial direction R from the third tubular portion 93. The third side-wall portion 96 is disposed so as to cover the axial direction second side L2 of the rotating electrical machine 1. In the present embodiment, the third tubular portion 93 is formed so as to extend to the axial direction second side L2 from an inner end of the third side-wall portion 96 in the radial direction R.

As shown in FIG. 1, the rotational position sensor 8 includes a sensor stator 81 fixed to the non-rotary member NR and a sensor rotor 82 rotatably supported with respect to the sensor stator 81. In the present embodiment, the rotational position sensor 8 is configured as a resolver. Therefore, the rotational position sensor 8 detects the rotational position of the target rotary member T by detecting a phase of alternating-current voltage corresponding to a relative angle of the sensor rotor 82 with respect to the sensor stator 81 when alternating current is applied to a coil provided in the sensor stator 81. Note that the rotational position sensor 8 is not limited to the resolver, and can include various kinds of sensors, such as a Hall element sensor, an encoder, and a magnetic rotation sensor, for example.

In the present embodiment, the sensor stator 81 is fixed to the third side-wall portion 96 of the case 9 as the non-rotary member NR. Then, the sensor stator 81 is disposed so as to protrude inward in the radial direction R from the third tubular portion 93 of the case 9. Furthermore, the sensor rotor 82 is coupled to the small-diameter portion 12c so as to rotate integrally with the rotor shaft 12b as the target rotary member T. Then, the sensor rotor 82 is disposed so as to face the sensor stator 81 from inside in the radial direction R.

The parking lock mechanism 10 includes a lock member 4 and a drive device 5.

The lock member 4 is configured to be movable to a lock position P1 at which the lock member 4 is engaged with the first rotary member RT1 to restrict the rotation of the first rotary member RT1, and to an unlock position P2 at which the lock member 4 is separated from the first rotary member RT1 to allow the rotation of the first rotary member RT1. The lock member 4 is supported so as to be relatively non-rotatable with respect to the non-rotary member NR. In the present embodiment, the lock member 4 includes a tubular portion 41 formed in a tubular shape concentric with the rotor 12. The tubular portion 41 is disposed outside the second tubular portion 92 of the case 9 in the radial direction R.

The lock member 4 includes a plurality of first engaging portions 411. The case 9 includes a plurality of first engaged portions 921 with which the plurality of first engaging portions 411 are engaged. Note that, in the following description, a direction along a direction in which the first rotary member RT1 rotates is referred to as a "circumferential direction C". Then, one side in the circumferential direction C is referred to as a "circumferential direction first side C1", and another side in the circumferential direction C is referred to as a "circumferential direction second side C2".

Figure 3:
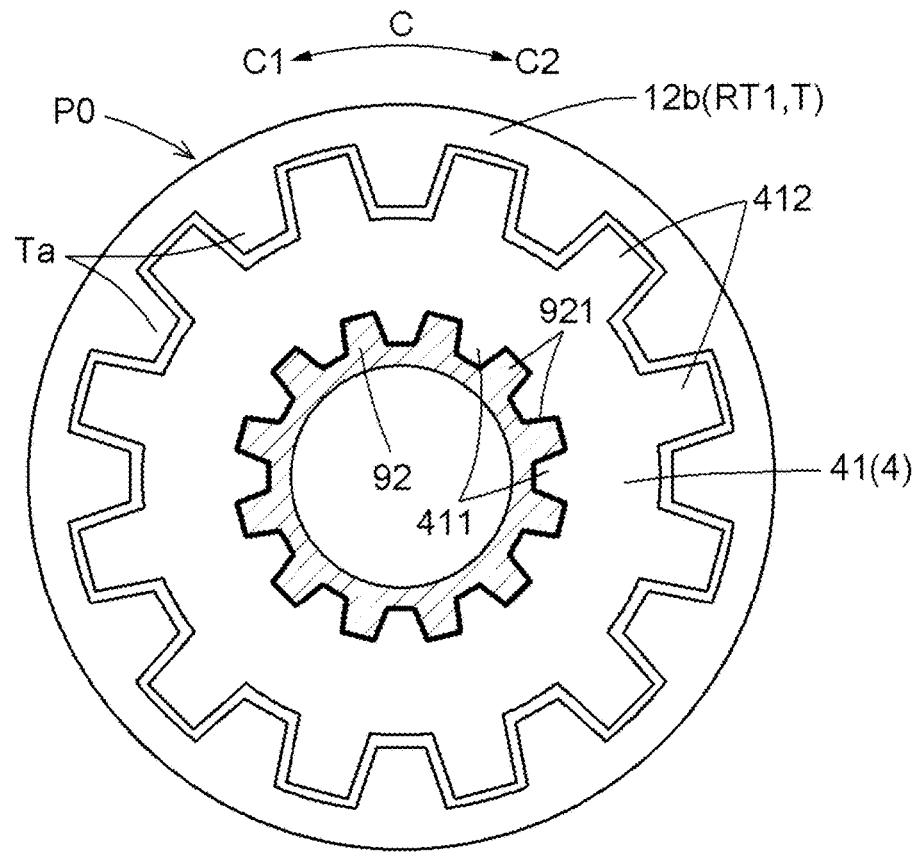
FIG. 3 is a diagram showing positional relationship between a target rotary member at a theoretical lock position and a lock member.

As shown in FIG. 3, each of the plurality of first engaging portions 411 and the plurality of first engaged portions 921 is disposed in the circumferential direction C. In the present embodiment, each of the plurality of first engaging portions 411 is a tooth portion formed on an inner peripheral surface of the tubular portion 41 of the lock member 4. Furthermore, each of the plurality of first engaged portions 921 is a tooth portion formed on an outer peripheral surface of the second tubular portion 92 of the case 9. Then, the plurality of first engaging portions 411 are movable in the axial direction L and are meshed with the plurality of first engaged portions 921 so as to be relatively non-rotatable. In examples shown in FIGS. 1 and 3, the plurality of first engaging portions 411 and the plurality of first engaged portions 921 are arranged at equal intervals in the circumferential direction C, and are continuously formed along the axial direction L.

Furthermore, the lock member 4 includes second engaging portions 412. The first rotary member RT1 includes a plurality of second engaged portions Ta with which the second engaging portions 412 are engaged. In the present embodiment, each of the second engaging portions 412 corresponds to an "engaging portion", and each of the second engaged portions Ta corresponds to an "engaged portion".

The plurality of second engaged portions Ta are disposed in the circumferential direction C. In the present embodiment, each of the plurality of second engaged portions Ta is a tooth portion formed on an inner peripheral surface of the first rotary member RT1 (here, the rotor shaft 12b). In the example shown in FIG. 3, the plurality of second engaged portions Ta are arranged at equal intervals in the circumferential direction C.

In the present embodiment, a plurality of second engaging portions 412 are disposed in the circumferential direction C. Then, each of the plurality of second engaging portions 412 is a tooth portion formed on an outer peripheral surface of the tubular portion 41 of the lock member 4. In the example shown in FIG. 3, the plurality of second engaging portions 412 are arranged at equal intervals in the circumferential direction C.

In the present embodiment, the plurality of second engaging portions 412 are engaged with the plurality of second engaged portions Ta from the axial direction first side L1 so as to restrict the rotation of the first rotary member RT1. In the example shown in FIG. 1, the plurality of second engaging portions 412 are continuously formed from an end surface on the axial direction second side L2 of the tubular portion 41 toward the axial direction first side L1. Furthermore, the plurality of second engaged portions Ta are continuously formed from an end surface on the axial direction first side L1 of the rotor shaft 12b toward the axial direction second side L2.

In the following description, a state of the parking lock mechanism 10 when the lock member 4 is at the lock position P1 is referred to as a "locked state", and a state of the parking lock mechanism 10 when the lock member 4 is at the unlock position P2 is referred to as an "unlocked state".

In the present embodiment, in a case where the lock member 4 moves from the unlock position P2 to the axial direction second side L2 and is at the lock position P1, the plurality of second engaging portions 412 in the tubular portion 41 are engaged with the plurality of second engaged portions Ta in the first rotary member RT1, and the parking lock mechanism 10 enters the locked state. Meanwhile, in a case where the lock member 4 is at the unlock position P2, the lock member 4 is separated from the first rotary member RT1 to the axial direction first side L1, and the parking lock mechanism 10 enters the unlocked state. Note that, in the present embodiment, not only a position at an end on the axial direction first side L1 in a motion range of the lock member 4 but also a position on the axial direction second side L2 with respect to the position of the end correspond to the unlock position P2. That is, in the present embodiment, the plurality of second engaging portions 412 are not engaged with the plurality of second engaged portions Ta when the lock member 4 is within a predetermined range on the axial direction second side L2 from the position at the end on the axial direction first side L1 in the motion range, and the plurality of second engaging portions 412 are engaged with the plurality of second engaged portions Ta when the lock member 4 moves from the range to the axial direction second side L2.

As shown in FIG. 1, the drive device 5 is a device that drives the lock member 4. In the present embodiment, the drive device 5 includes a position holding portion 6 and an electromagnetic drive part 7.

The position holding portion 6 includes a permanent magnet 61 supported by the lock member 4. The position holding portion 6 holds the lock member 4 at each of the lock position P1 and the unlock position P2 with magnetic force of the permanent magnet 61. Note that the permanent magnet 61 may be formed by joining a plurality of divided magnets.

The permanent magnet 61 is a permanent magnet having an N pole and an S pole. In the present embodiment, the permanent magnet 61 is disposed such that the N pole and the S pole are aligned in the axial direction L. Specifically, the permanent magnet 61 is disposed such that the N pole and the S pole are aligned in the axial direction L on the electromagnetic drive part 7 side (in the present embodiment, outside in the radial direction R). For example, one permanent magnet 61 is disposed such that the N pole and the S pole of the permanent magnet 61 are aligned in the axial direction L on the electromagnetic drive part 7 side. Alternatively, two permanent magnets 61 are disposed such that the N pole of one permanent magnet 61 and the S pole of another permanent magnet 61 are aligned in the axial direction L on the electromagnetic drive part 7 side. In the following description, one of the N pole and the S pole of the permanent magnet 61 is referred to as a "first pole 61A", and another is referred to as a "second pole 61B". The permanent magnet 61 is disposed such that the first pole 61A and the second pole 61B are aligned in this order from the axial direction first side L1 toward the axial direction second side L2.

In the present embodiment, the permanent magnet 61 is formed in a tubular shape concentric with the rotor 12. Then, the permanent magnet 61 is fixed to the tubular portion 41 of the lock member 4. In the example shown in FIG. 1, the permanent magnet 61 is fixed to a portion on the axial direction first side L1 with respect to the second engaging portions 412 on the outer peripheral surface of the tubular portion 41.

With electromagnetic force generated by electric power from a power source (not shown), the electromagnetic drive part 7 moves the lock member 4 from the unlock position P2 to the lock position P1 and moves the lock member 4 from the lock position P1 to the unlock position P2. In the present embodiment, the electromagnetic drive part 7 is formed in a cylindrical shape concentric with the permanent magnet 61. Furthermore, in the present embodiment, the electromagnetic drive part 7 includes a fixing portion 70, a first magnetic body portion 71, a second magnetic body portion 72, a third magnetic body portion 73, and a coil 74.

The fixing portion 70 is fixed to the non-rotary member NR. In the present embodiment, the fixing portion 70 is formed in a tubular shape concentric with the first tubular portion 91 of the case 9. Then, the fixing portion 70 is fixed to an inner peripheral surface of the first tubular portion 91.

Each of the first magnetic body portion 71, the second magnetic body portion 72, and the third magnetic body portion 73 includes a magnetic body. The first magnetic body portion 71, the second magnetic body portion 72, and the third magnetic body portion 73 are disposed so as to align in the described order at intervals from one another in the axial direction L. In the present embodiment, the first magnetic body portion 71, the second magnetic body portion 72, and the third magnetic body portion 73 are formed so as to protrude inward in the radial direction R from the fixing portion 70. Then, the first magnetic body portion 71, the second magnetic body portion 72, and the third magnetic body portion 73 are disposed so as to align in the described order from the axial direction first side L1 toward the axial direction second side L2.

The coil 74 is configured to generate a magnetic flux passing through the first magnetic body portion 71, the second magnetic body portion 72, and the third magnetic body portion 73 with energization. In the present embodiment, the coil 74 is wound between the first magnetic body portion 71 and the second magnetic body portion 72 in the axial direction L and between the second magnetic body portion 72 and the third magnetic body portion 73 in the axial direction L, on an inner peripheral surface of the fixing portion 70.

Figure 4:
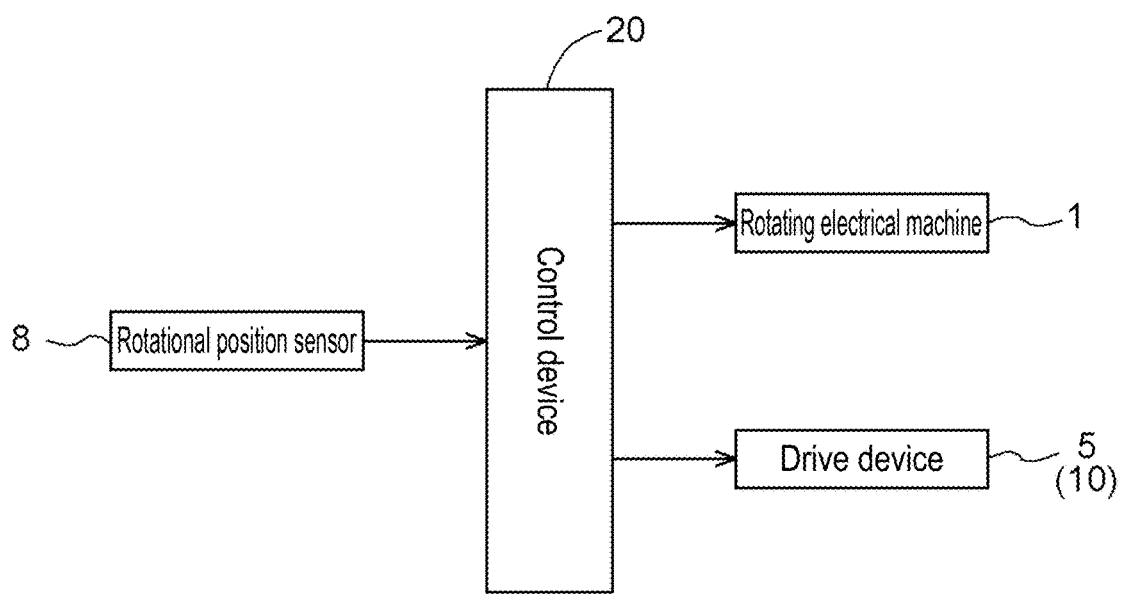
FIG. 4 is a control block diagram of the vehicle drive device according to the embodiment.

As shown in FIG. 4, the vehicle drive device 100 includes a control device 20 that controls the rotating electrical machine 1 and the parking lock mechanism 10.

In the present embodiment, the control device 20 controls operation of the lock member 4 by controlling current flowing through the coil 74. More specifically, when the control device 20 does not apply current to the coil 74 and the lock member 4 is at the unlock position P2, the first pole 61A attracts the first magnetic body portion 71 and the second pole 61B attracts the second magnetic body portion 72. Then, when the lock member 4 is moved from the unlock position P2 to the lock position P1, the control device 20 applies current to the coil 74 so that the first magnetic body portion 71 becomes a pole repelling the first pole 61A, the second magnetic body portion 72 becomes a pole repelling the second pole 61B, and the third magnetic body portion 73 becomes a pole attracting the second pole 61B. Furthermore, when the control device 20 does not apply current to the coil 74 and the lock member 4 is at the lock position P1, the first pole 61A attracts the second magnetic body portion 72 and the second pole 61B attracts the third magnetic body portion 73. Then, when the lock member 4 is moved from the lock position P1 to the unlock position P2, the control device 20 applies current to the coil 74 so that the second magnetic body portion 72 becomes a pole repelling the first pole 61A, the third magnetic body portion 73 becomes a pole repelling the second pole 61B, and the first magnetic body portion 71 becomes a pole attracting the first pole 61A.

Meanwhile, when a vehicle equipped with the vehicle drive device 100 is stopped on an inclined road surface, torque is transmitted from the wheels W to the first rotary member RT1 (here, the rotor shaft 12b) by weight of the vehicle. Therefore, the torque acts on the first rotary member RT1 so as to enhance engagement force between the lock member 4 and the first rotary member RT1 (here, engagement force between the second engaging portions 412 and the second engaged portions Ta).

At this time, depending on strength of the engagement force between the lock member 4 and the first rotary member RT1, driving force (here, electromagnetic force) of the drive device 5 may not be able to disengage the lock member 4 from the first rotary member RT1. Therefore, in a case where the drive device 5 generates driving force for moving the lock member 4 from the lock position P1 to the unlock position P2, the control device 20 executes unlock assist processing that causes the rotating electrical machine 1 to output torque in a direction opposite to a wheel torque direction Ct, which is a direction of the torque transmitted from the wheels W to the first rotary member RT1. Because the unlock assist processing can weaken the engagement force between the lock member 4 and the first rotary member RT1, the driving force of the drive device 5 can disengage the lock member 4 from the first rotary member RT1.

Furthermore, in executing the unlock assist processing described above, the control device 20 executes torque direction determination processing that determines the wheel torque direction Ct. Here, there is backlash in a rotation direction (circumferential direction C) between the lock member 4 at the lock position P1 and the first rotary member RT1. Therefore, when the vehicle equipped with the vehicle drive device 100 is stopped on the inclined road surface, the rotational position of the target rotary member T shifts due to the backlash. Therefore, in the torque direction determination processing, the control device 20 determines the wheel torque direction Ct on the basis of a direction in which a detected rotational position is deviated from a theoretical lock position P0 due to backlash. Here, the "theoretical lock position P0" is a rotational position of the target rotary member T (a rotational position of the target rotary member T shown in FIG. 3) in a case where it is assumed that there is no backlash when the parking lock mechanism 10 is in the locked state. Furthermore, the "detected rotational position" is a rotational position of the target rotary member T detected by the rotational position sensor 8 when the parking lock mechanism 10 is in the locked state.

In the present embodiment, the control device 20 determines the wheel torque direction Ct on the basis of a remainder of a division of θ by (360/N). Here, "θ" represents the detected rotational position[°]. Then, "N" represents the number of the second engaged portions Ta, and "/" represents a division operator. Therefore, "360/N" represents a pitch[°] between adjacent second engaged portions Ta.

Hereinafter, an example of the torque direction determination processing by the control device 20 will be described with reference to FIGS. 5 to 10. In the example shown in FIGS. 5 to 10, the number of second engaged portions Ta is 12 (N=12). Therefore, in the present example, the pitch between the adjacent second engaged portions Ta is 30[°] (360/N=360/12=30).

Figure 5:
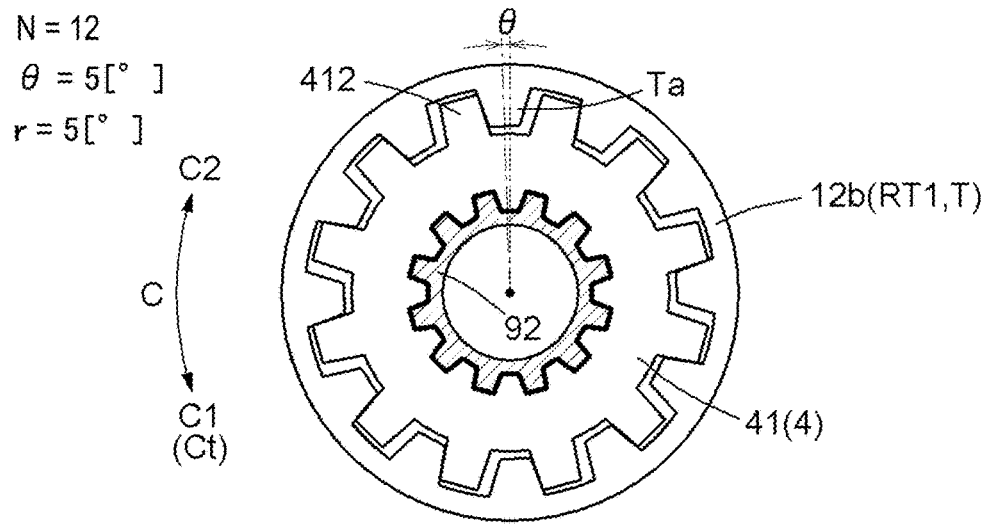
FIG. 5 is a diagram showing positional relationship between the target rotary member and the lock member in a case where torque toward one side in a circumferential direction is transmitted to the target rotary member.
Figure 6:
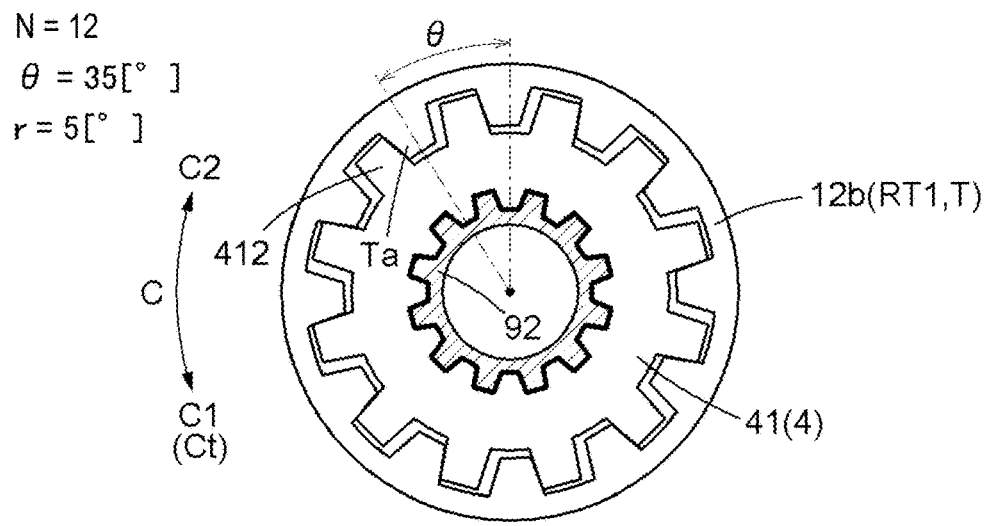
FIG. 6 is a diagram showing positional relationship between the target rotary member and the lock member in a case where torque toward one side in a circumferential direction is transmitted to the target rotary member.
Figure 7:
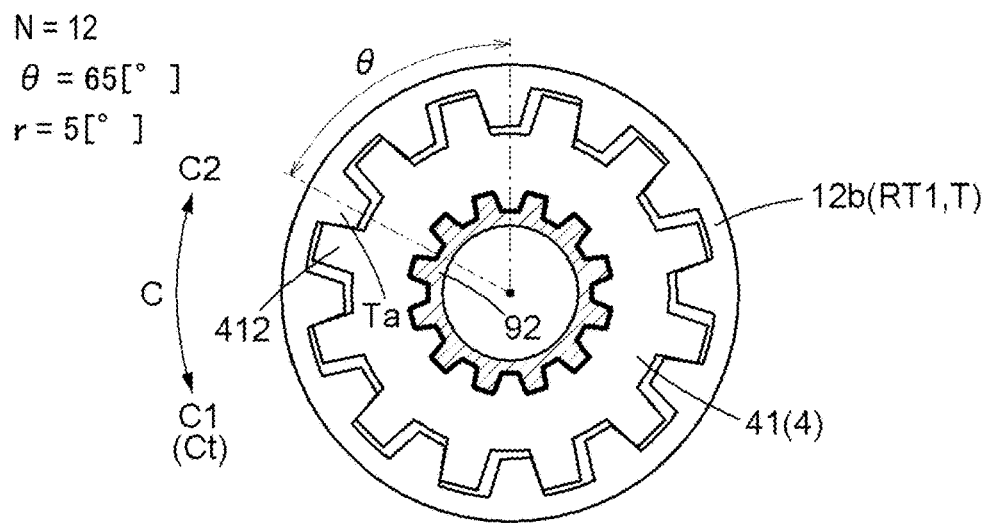
FIG. 7 is a diagram showing positional relationship between the target rotary member and the lock member in a case where torque toward one side in a circumferential direction is transmitted to the target rotary member.
Figure 8:
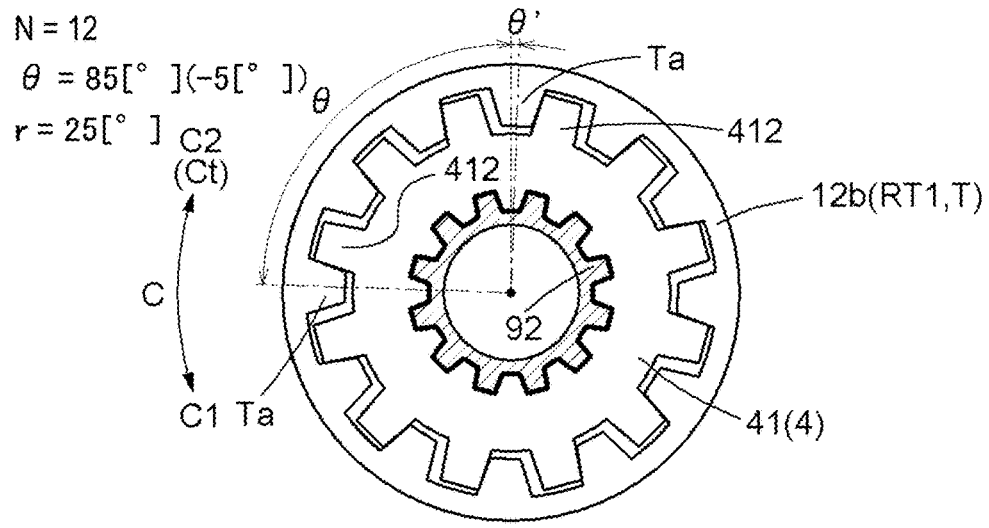
FIG. 8 is a diagram showing positional relationship between the target rotary member and the lock member in a case where torque toward another side in a circumferential direction is transmitted to the target rotary member.
Figure 9:
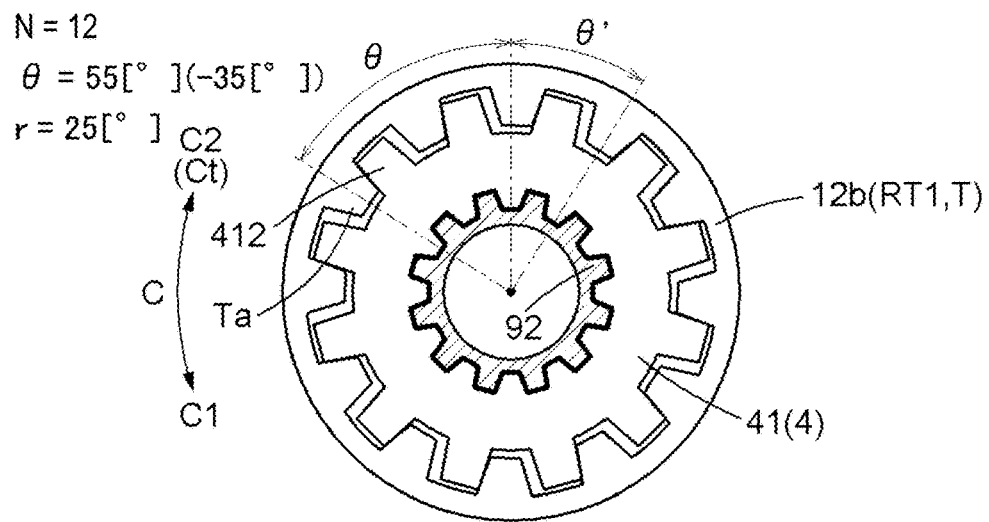
FIG. 9 is a diagram showing positional relationship between the target rotary member and the lock member in a case where torque toward another side in a circumferential direction is transmitted to the target rotary member.
Figure 10:
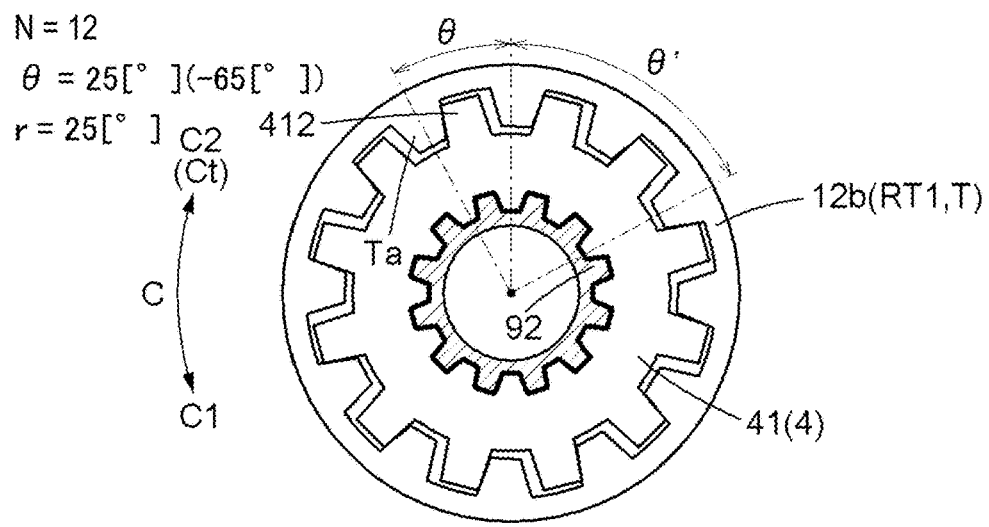
FIG. 10 is a diagram showing positional relationship between the target rotary member and the lock member in a case where torque toward another side in a circumferential direction is transmitted to the target rotary member.

FIGS. 5 to 7 are diagrams showing positional relationship between the rotor shaft 12b as the first rotary member RT1 and target rotary member T and the lock member 4 in a case where torque toward the circumferential direction first side C1 is transmitted to the rotor shaft 12b. Furthermore, FIGS. 8 to 10 are diagrams showing positional relationship between the rotor shaft 12b as the first rotary member RT1 and target rotary member T and the lock member 4 in a case where torque toward the circumferential direction second side C2 is transmitted to the rotor shaft 12b.

In the present embodiment, the rotational position sensor 8 is set such that a detected value of the rotational position of the target rotary member T is zero at one of the theoretical lock position P0 of N. Here, the rotational position sensor 8 is set such that the detected value of the rotational position of the target rotary member T at the theoretical lock position P0 shown in FIG. 3 is zero (θ=0).

According to the configuration, arithmetic processing that determines the wheel torque direction Ct can be simplified.

The rotor shaft 12b shown in FIG. 5 rotates by an amount of backlash toward the circumferential direction first side C1 from the rotational position (theoretical lock position P0) of the rotor shaft 12b shown in FIG. 3. In the example shown in FIG. 5, the detected rotational position is 5[°] (θ=5).

The rotational position of the rotor shaft 12b shown in FIG. 6 is shifted by 30[°] toward the circumferential direction first side C1 from the rotor shaft 12b shown in FIG. 5. That is, the plurality of second engaged portions Ta shown in FIG. 6 are engaged with the plurality of second engaging portions 412 at positions shifted by one toward the circumferential direction first side C1 from the plurality of second engaged portions Ta shown in FIG. 5. Therefore, in the example shown in FIG. 6, the detected rotational position is 35[°] (θ=35).

The rotational position of the rotor shaft 12b shown in FIG. 7 is shifted by 30[°] toward the circumferential direction first side C1 from the rotor shaft 12b shown in FIG. 6. That is, the plurality of second engaged portions Ta shown in FIG. 7 are engaged with the plurality of second engaging portions 412 at positions shifted by one toward the circumferential direction first side C1 from the plurality of second engaged portions Ta shown in FIG. 6. Therefore, in the example shown in FIG. 7, the detected rotational position is 65[°] (θ=65).

Furthermore, the rotor shaft 12b shown in FIG. 8 rotates by an amount of backlash toward the circumferential direction second side C2 from the rotational position (theoretical lock position P0) of the rotor shaft 12b shown in FIG. 3. In the example shown in FIG. 8, the detected rotational position is 85[°] (θ=85). Note that, in the present example, because the rotational position sensor 8 is a resolver having four poles, the detected rotational position is detected in a range of 0 to 90[°]. Therefore, 85[°] in the present example corresponds to −5[°] (refer to θ' shown in FIG. 8) in a case where a rotational position sensor that detects a detected rotational position in a range of −180 to 180[°] is assumed to be used as the rotational position sensor 8.

The rotational position of the rotor shaft 12b shown in FIG. 9 is shifted by 30[°] toward the circumferential direction second side C2 from the rotor shaft 12b shown in FIG. 8. That is, the plurality of second engaged portions Ta shown in FIG. 9 are engaged with the plurality of second engaging portions 412 at positions shifted by one toward the circumferential direction second side C2 from the plurality of second engaged portions Ta shown in FIG. 8. Therefore, in the example shown in FIG. 9, the detected rotational position is 55[°] (θ=55). Note that 55[°] in the present example corresponds to −35[°] (refer to θ' shown in FIG. 9) in a case where a rotational position sensor that detects a detected rotational position in a range of −180 to 180[°] is assumed to be used as the rotational position sensor 8.

The rotational position of the rotor shaft 12b shown in FIG. 10 is shifted by 30[°] toward the circumferential direction second side C2 from the rotor shaft 12b shown in FIG. 9. That is, the plurality of second engaged portions Ta shown in FIG. 10 are engaged with the plurality of second engaging portions 412 at positions shifted by one toward the circumferential direction second side C2 from the plurality of second engaged portions Ta shown in FIG. 9. Therefore, in the example shown in FIG. 10, the detected rotational position is 25[°] (θ=25). Note that 25[°] in the present example corresponds to −65[°] (refer to θ' shown in FIG. 10) in a case where a rotational position sensor that detects a detected rotational position in a range of −180 to 180[°] is assumed to be used as the rotational position sensor 8.

In the examples shown in FIGS. 5 to 7, the remainder of the division of θ by (360/N) is 5[°]. Furthermore, in the examples shown in FIGS. 8 to 10, the remainder of the division of θ by (360/N) is 25[°]. Note that, in the examples shown in FIGS. 5 to 10, "r" represents a remainder of a division of θ by (360/N).

Thus, a remainder of a division of θ by (360/N) is sorted into two groups depending on whether the wheel torque direction Ct is toward the circumferential direction first side C1 or the circumferential direction second side C2. In the present example, the control device 20 determines that the wheel torque direction Ct is toward the circumferential direction first side C1 in a case where the remainder of the division of θ by (360/N) is within a range of 5±α[°]. In the examples shown in FIGS. 5 to 7, the remainder of the division of θ by (360/N) is 5[°], which is within the range of 5±α[°]. Furthermore, the control device 20 determines that the wheel torque direction Ct is toward the circumferential direction second side C2 in a case where the remainder of the division of θ by (360/N) is within a range of 25±α[°]. In the examples shown in FIGS. 8 to 10, the remainder of the division of θ by (360/N) is 25[°], which is within the range of 25±α[°]. Here, "α" is a value set in advance on the basis of an error (including an error caused by an installation place of the rotational position sensor 8, an error caused by temperature, or the like, for example) in an output value of the rotational position sensor 8.

Figure 11:
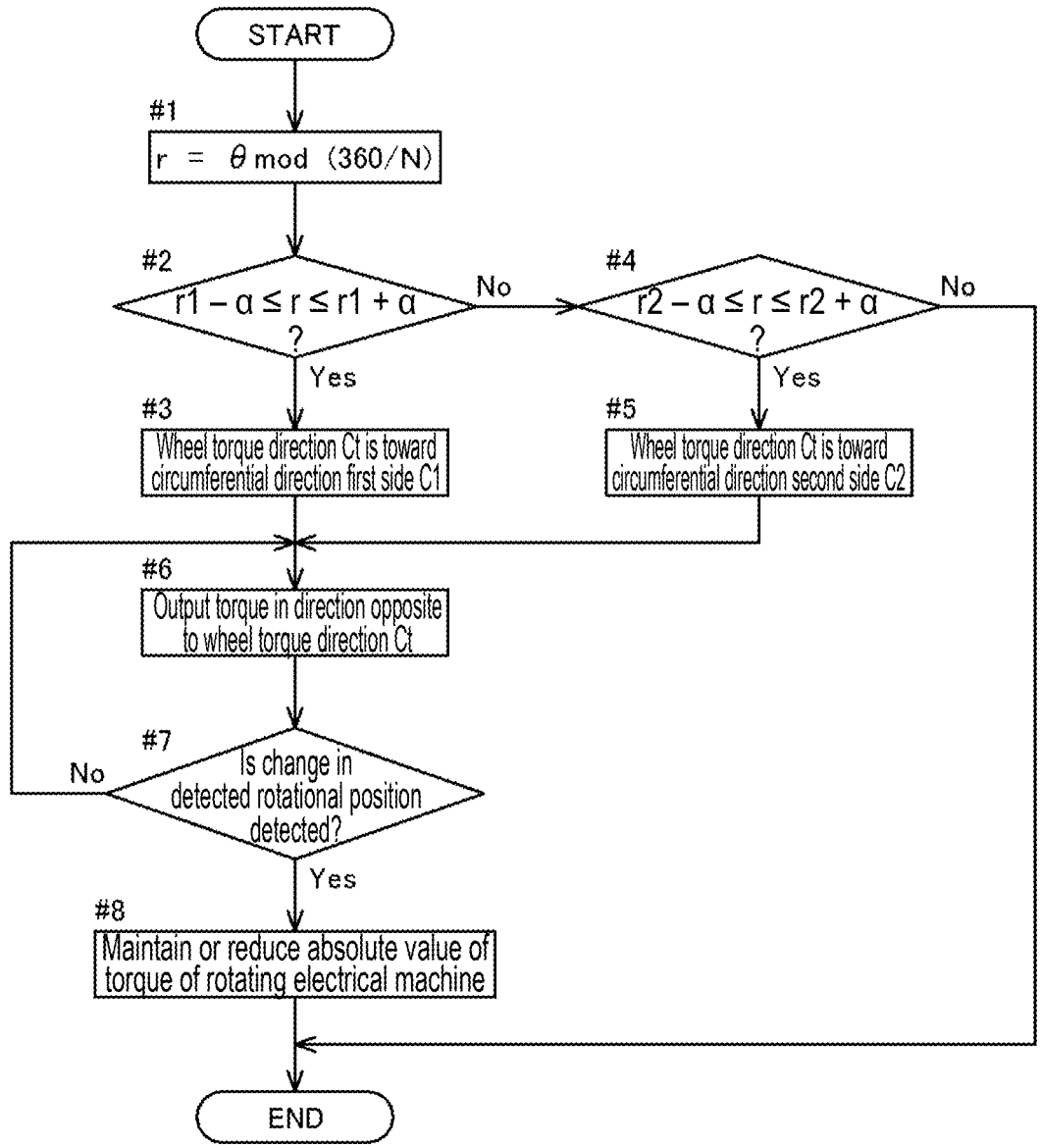
FIG. 11 is a flowchart showing an example of torque direction determination processing and unlock assist processing by a control device.

FIG. 11 is a flowchart showing an example of the torque direction determination processing and unlock assist processing by the control device 20.

As shown in FIG. 11, first, the control device 20 calculates the remainder of the division of θ by (360/N) (Step #1). Note that "r" in the formula shown in Step #1 in FIG. 11 represents a remainder of the division of θ by (360/N), and "mod" represents an operator of a modulo operation.

Next, the control device 20 determines whether or not the remainder (r) of the division of θ by (360/N) is within a specified range of r1±α (Step #2). In a case where the remainder of the division of θ by (360/N) is within the specified range of r1±α (Step #2: Yes), the control device 20 determines that the wheel torque direction Ct is toward the circumferential direction first side C1 (Step #3). Note that each of r and r1 is 5[°] in the examples shown in FIGS. 5 to 7. For example, r1 is set to a half value of a rotatable range (angular range) of the target rotary member T (the first rotary member RT1 in the present example) allowed by backlash in the locked state. In a case where r1 is set in this manner, r1 is set to 5[°] when the rotatable range is 10[°].

Meanwhile, in a case where the remainder of the division of θ by (360/N) is not within the specified range of r1±α (Step #2: No), the control device 20 determines whether or not the remainder (r) of the division of θ by (360/N) is within a specified range of r2±α (Step #4). In a case where the remainder (r) of the division of θ by (360/N) is within the specified range of r2±α (Step #4: Yes), the control device 20 determines that the wheel torque direction Ct is toward the circumferential direction second side C2 (Step #5). Note that each of r and r2 is 25[°] in the examples shown in FIGS. 8 to 10. For example, r2 is set to a value obtained by subtracting a set value of r1 from (360/N).

Steps #1 to #5 described above correspond to the torque direction determination processing. After the torque direction determination processing, the control device 20 executes the unlock assist processing that causes the rotating electrical machine 1 to output torque in a direction opposite to the wheel torque direction Ct (Step #6).

The control device 20 determines whether or not the detected rotational position has changed during the unlock assist processing in a direction opposite to the direction of deviation from the theoretical lock position P0 due to backlash (Step #7). In a case where the control device 20 detects that the detected rotational position has changed in a direction opposite to the direction of deviation from the theoretical lock position P0 due to backlash (Step #7: Yes), the control device 20 maintains or reduces an absolute value of torque of the rotating electrical machine 1 (Step #8). For example, in the examples shown in FIGS. 5 to 7, the control device 20 maintains or reduces the absolute value of the torque of the rotating electrical machine 1 when detecting that the detected rotational position has changed during the unlock assist processing to the circumferential direction second side C2. Meanwhile, in a case where the control device 20 does not detect that the detected rotational position has changed in a direction opposite to the direction of deviation from the theoretical lock position P0 due to backlash (Step #7: No), the control device 20 returns to Step #6 described above and continues the processing.

According to the configuration, it is possible to avoid the lock member 4 from being hindered to move by an excessive increase in the absolute value of the torque of the rotating electrical machine 1 in the unlock assist processing, the excessive increase causing an increase in the engagement force between the lock member 4 and the first rotary member RT1.

Thus, in the present embodiment,
a direction along a direction in which the first rotary member RT1 rotates is defined as the circumferential direction C,
the first rotary member RT1 includes the plurality of second engaged portions Ta disposed in the circumferential direction C and with which the second engaging portions 412 of the lock member 4 are engaged,
the detected rotational position is represented as θ[°], and the number of the second engaged portions Ta is represented as N, and
the control device 20 determines the wheel torque direction Ct on the basis of a remainder of a division of θ by (360/N).

According to the configuration, the wheel torque direction Ct can be determined by relatively simple arithmetic processing.

As described above, the vehicle drive device 100 includes
the rotating electrical machine 1 that functions as a driving force source for the wheels W,
the parking lock mechanism 10 that selectively restricts rotation of the first rotary member RT1 that rotates in conjunction with the wheels W,
the rotational position sensor 8 that detects a rotational position of the target rotary member T that is either the second rotary member RT2 that rotates in conjunction with the wheels W and is disposed on the wheels W side with respect to the first rotary member RT1 on the power transmission path connecting the rotating electrical machine 1 and the wheels W, or the first rotary member RT1, and
the control device 20 that acquires a detected value from the rotational position sensor 8 and controls the rotating electrical machine 1 and the parking lock mechanism 10, in which
the parking lock mechanism 10 includes the lock member 4 that is movable to the lock position P1 at which the lock member 4 is engaged with the first rotary member RT1 to restrict rotation of the first rotary member RT1, and to the unlock position P2 at which the lock member 4 is separated from the first rotary member RT1 to allow rotation of the first rotary member RT1, and the drive device 5 that drives the lock member 4,
there is backlash in a rotation direction between the lock member 4 at the lock position P1 and the first rotary member RT1,
a state of the parking lock mechanism 10 when the lock member 4 is at the lock position P1 is defined as the locked state, a rotational position of the target rotary member T, the rotational position being detected in the locked state by the rotational position sensor 8, is defined as the detected rotational position, and a rotational position of the target rotary member T in a case where it is assumed that there is not the backlash in the locked state is defined as the theoretical lock position P0, and
the control device 20 executes the torque direction determination processing that determines the wheel torque direction Ct that is a direction of torque transmitted from the wheels W to the first rotary member RT1, on the basis of a direction of deviation of the detected rotational position from the theoretical lock position P0 due to the backlash.

According to the configuration, in the torque direction determination processing, the wheel torque direction Ct is determined on the basis of the direction in which the detected rotational position is deviated from the theoretical lock position P0 due to the backlash. As a result, torque in a direction to weaken engagement force between the lock member 4 and the first rotary member RT1 can be appropriately output to the rotating electrical machine 1. Therefore, it is possible to appropriately control torque of the rotating electrical machine 1 in a case of unlocking the parking lock mechanism 10. In this way, even in a case where driving force of the drive device 5 cannot move the lock member 4 from the lock position P1 to the unlock position P2 side, engagement force between the lock member 4 and the first rotary member RT1 can be weakened by using the torque of the rotating electrical machine 1, and thus the driving force of the drive device 5 can unlock the parking lock mechanism 10.

Furthermore, according to the configuration, it is possible to eliminate need for various sensors, such as an inclination angle sensor, for determining the wheel torque direction Ct. Therefore, it is easy to simplify and reduce costs for a configuration of the vehicle drive device 100.

Furthermore, as described above, in the present embodiment, in a case where the drive device 5 generates driving force for moving the lock member 4 from the lock position P1 to the unlock position P2, the control device 20 executes the unlock assist processing that causes the rotating electrical machine 1 to output torque in a direction opposite to the wheel torque direction Ct.

According to the configuration, in the unlock assist processing, torque in a direction to weaken engagement force between the lock member 4 and the first rotary member RT1 can be appropriately output to the rotating electrical machine 1.

In the present embodiment, the backlash is set so as to be greater than the error in the output value of the rotational position sensor 8. Note that the error in the output value of the rotational position sensor 8, including an error caused by an installation place of the rotational position sensor 8, an error caused by temperature, or the like for example, can be grasped in advance with an experiment or the like.

According to the configuration, it is easy to avoid erroneous determination of the wheel torque direction Ct due to an error in an output value of the rotational position sensor 8.

Other Embodiments (1) In the embodiment described above, a configuration in which the first rotary member RT1 is the rotor shaft 12*b* has been described as an example. However, the present disclosure is not limited to such a configuration, and for example, the first rotary member RT1 may be the carrier CR. Alternatively, a parking gear coupled to the rotary member may be the first rotary member RT1, instead of the rotary member itself that constitutes the power transmission path connecting the rotating electrical machine 1 and the wheels W.

(2) In the embodiment described above, a configuration in which the first rotary member RT1 is the target rotary member T has been described as an example. However, the present disclosure is not limited to such a configuration, and the second rotary member RT2 may be the target rotary member T. In this case, in the embodiment described above, the first gear 22 is the second rotary member RT2, and thus the first gear 22 is the target rotary member T. Then, it is only required to provide a rotational position sensor for detecting a rotational position of the first gear 22, separately from the rotational position sensor 8.

(3) In the embodiment described above, a configuration in which the drive device 5 moves the lock member 4 from the lock position P1 to the unlock position P2 with electromagnetic force has been described as an example. However, the present disclosure is not limited to such a configuration. For example, driving force of an electric motor may move the lock member 4 from the lock position P1 to the unlock position P2.

(4) In the embodiment described above, a configuration in which the number of the second engaged portions Ta is 12 (N=12) has been described as an example, but the present disclosure is not limited to such a configuration. The number of the second engaged portions Ta is preferably an integral multiple of the number of poles of the resolver in a case where the rotational position sensor 8 is the resolver. For example, in a case where the resolver has four poles, the number of the second engaged portions Ta is preferably 8, 16, 20, or the like, other than 12.

(5) Note that configurations disclosed in each of the embodiments described above can be applied in combination with a configuration disclosed in another embodiment unless there is a contradiction. For other configurations, the embodiments disclosed herein are merely examples in all respects. Therefore, various modifications can be appropriately made without departing from the gist of the present disclosure.

Summary of Present Embodiment

Hereinafter, an overview of a vehicle drive device (100) described above will be described.

A vehicle drive device (100) includes
a rotating electrical machine (1) that functions as a driving force source for wheels (W),
a parking lock mechanism (10) that selectively restricts rotation of a first rotary member (RT1) that rotates in conjunction with the wheels (W),
a rotational position sensor (8) that detects a rotational position of a target rotary member (T) that is either a second rotary member (RT2) that rotates in conjunction with the wheels (W) and is disposed on the wheels (W) side with respect to the first rotary member (RT1) on a power transmission path connecting the rotating electrical machine (1) and the wheels (W), or the first rotary member (RT1), and
a control device (20) that acquires a detected value from the rotational position sensor (8) and controls the rotating electrical machine (1) and the parking lock mechanism (10), in which
the parking lock mechanism (10) includes a lock member (4) that is movable to a lock position (P1) at which the lock member (4) is engaged with the first rotary member (RT1) to restrict rotation of the first rotary member (RT1), and to an unlock position (P2) at which the lock member (4) is separated from the first rotary member (RT1) to allow rotation of the first rotary member (RT1), and a drive device (5) that drives the lock member (4),
there is backlash in a rotation direction between the lock member (4) at the lock position (P1) and the first rotary member (RT1), a state of the parking lock mechanism (10) when the lock member (4) is at the lock position (P1) is defined as a locked state, a rotational position of the target rotary member (T), the rotational position being detected in the locked state by the rotational position sensor (8), is defined as a detected rotational position, and a rotational position of the target rotary member (T) in a case where it is assumed that there is not the backlash in the locked state is defined as a theoretical lock position (P0), and the control device (20) executes torque direction determination processing that determines a wheel torque direction (Ct) that is a direction of torque transmitted from the wheels (W) to the first rotary member (RT1), on the basis of a direction of deviation of the detected rotational position from the theoretical lock position (P0) due to the backlash.

According to the configuration, in the torque direction determination processing, the wheel torque direction (Ct) is determined on the basis of the direction in which the detected rotational position is deviated from the theoretical lock position (P0) due to the backlash. As a result, torque in a direction to weaken engagement force between the lock member (4) and the first rotary member (RT1) can be appropriately output to the rotating electrical machine (1). Therefore, it is possible to appropriately control torque of the rotating electrical machine (1) in a case of unlocking the parking lock mechanism (10). In this way, even in a case where driving force of the drive device (5) cannot move the lock member (4) from the lock position (P1) to the unlock position (P2) side, engagement force between the lock member (4) and the first rotary member (RT1) can be weakened by using the torque of the rotating electrical machine (1), and thus the driving force of the drive device (5) can unlock the parking lock mechanism (10).

Furthermore, according to the configuration, it is possible to eliminate need for various sensors, such as an inclination angle sensor, for determining the wheel torque direction (Ct). Therefore, it is easy to simplify and reduce costs for a configuration of the vehicle drive device (100).

Here, in a case where the drive device (5) generates driving force for moving the lock member (4) from the lock position (P1) to the unlock position (P2), the control device (20) preferably executes unlock assist processing that causes the rotating electrical machine (1) to output torque in a direction opposite to the wheel torque direction (Ct).

According to the configuration, in the unlock assist processing, torque in a direction to weaken engagement force between the lock member (4) and the first rotary member (RT1) can be appropriately output to the rotating electrical machine (1).

Furthermore, a direction along a direction in which the first rotary member (RT1) rotates is preferably defined as a circumferential direction (C), the first rotary member (RT1) preferably includes a plurality of engaged portions (Ta) disposed in the circumferential direction (C) and with which engaging portions (412) of the lock member (4) are engaged, the detected rotational position is preferably represented as θ[°], and the number of the engaged portions (Ta) is preferably represented as N, and the control device (20) preferably determines the wheel torque direction (Ct) on the basis of a remainder of a division of θ by (360/N).

According to the configuration, the wheel torque direction (Ct) can be determined by relatively simple arithmetic processing.

In the configuration described above, the backlash is preferably set so as to be greater than an error in an output value of the rotational position sensor (8).

According to the configuration, it is easy to avoid erroneous determination of the wheel torque direction (Ct) due to an error in an output value of the rotational position sensor (8).

Furthermore, in the configuration described above, the rotational position sensor (8) is preferably set such that a detected value of a rotational position of the target rotary member (T) is zero at one of the theoretical lock position (P0) of N.

According to the configuration, arithmetic processing that determines the wheel torque direction (Ct) can be simplified.

Furthermore, in the configuration described above, in a case where the control device (20) detects that the detected rotational position has changed during the unlock assist processing in a direction opposite to a direction of deviation from the theoretical lock position (P0) due to the backlash, the control device (20) preferably maintains or reduces an absolute value of torque of the rotating electrical machine (1).

According to the configuration, it is possible to avoid the lock member (4) from being hindered to move by an excessive increase in the absolute value of the torque of the rotating electrical machine (1) in the unlock assist processing, the excessive increase causing an increase in the engagement force between the lock member (4) and the first rotary member (RT1).

INDUSTRIAL APPLICABILITY

The technology according to the present disclosure can be applied to a vehicle drive device including a rotating electrical machine that functions as a driving force source of wheels, and a parking lock mechanism that selectively restricts rotation of a rotary member that rotates in conjunction with the wheels.

REFERENCE SIGNS LIST

100: Vehicle drive device, 1: Rotating electrical machine, 4: Lock member, 412: Second engaging portion (engaging portion), 5: Drive device, 8: Rotational position sensor, 10: Parking lock mechanism, 20: Control device, RT1: First rotary member, RT2: Second rotary member, T: Target rotary member, Ta: Second engaged portion (engaged portion), W: Wheel, P0: Theoretical lock position, P1: Lock position, P2: Unlock position, C: Circumferential direction, and Ct: Wheel torque direction

The invention claimed is:

1. A vehicle drive device comprising:
   a rotating electrical machine that functions as a driving force source for wheels;
   a parking lock mechanism that selectively restricts rotation of a first rotary member that rotates in conjunction with the wheels;
   a rotational position sensor that detects a rotational position of a target rotary member that is either a second rotary member that rotates in conjunction with the wheels and is disposed on the wheels side with respect to the first rotary member on a power transmission path connecting the rotating electrical machine and the wheels, or the first rotary member; and a control device that acquires a detected value from the rotational position sensor and controls the rotating electrical machine and the parking lock mechanism, wherein the parking lock mechanism includes a lock member that is movable to a lock position at which the lock member is engaged with the first rotary member to restrict rotation of the first rotary member, and to an unlock position at which the lock member is separated from the first rotary member to allow rotation of the first rotary member, and a drive device that drives the lock member, there is backlash in a rotation direction between the lock member at the lock position and the first rotary member, a state of the parking lock mechanism when the lock member is at the lock position is defined as a locked state, a rotational position of the target rotary member, the rotational position being detected in the locked state by the rotational position sensor, is defined as a detected rotational position, and a rotational position of the target rotary member in a case where it is assumed that there is not the backlash in the locked state is defined as a theoretical lock position, and the control device executes torque direction determination processing that determines a wheel torque direction that is a direction of torque transmitted from the wheels to the first rotary member, on the basis of a direction of deviation of the detected rotational position from the theoretical lock position due to the backlash.

2. The vehicle drive device according to claim 1, wherein, in a case where the drive device generates driving force for moving the lock member from the lock position to the unlock position, the control device executes unlock assist processing that causes the rotating electrical machine to output torque in a direction opposite to the wheel torque direction.

3. The vehicle drive device according to claim 2, wherein, in a case where the control device detects that the detected rotational position has changed during the unlock assist processing in a direction opposite to a direction of deviation from the theoretical lock position due to the backlash, the control device maintains or reduces an absolute value of torque of the rotating electrical machine.

4. The vehicle drive device according to claim 2, wherein a direction along a direction in which the first rotary member rotates is defined as a circumferential direction, the first rotary member includes a plurality of engaged portions disposed in the circumferential direction and with which engaging portions of the lock member are engaged, the detected rotational position is represented as $\theta[°]$, and the number of the engaged portions is represented as N, and the control device determines the wheel torque direction on the basis of a remainder of a division of $\theta$ by (360/N).

5. The vehicle drive device according to claim 4, wherein the backlash is set so as to be greater than an error in an output value of the rotational position sensor.

6. The vehicle drive device according to claim 4, wherein the rotational position sensor is set such that a detected value of a rotational position of the target rotary member is zero at one of the theoretical lock position of N.

7. The vehicle drive device according to claim 1, wherein a direction along a direction in which the first rotary member rotates is defined as a circumferential direction, the first rotary member includes a plurality of engaged portions disposed in the circumferential direction and with which engaging portions of the lock member are engaged, the detected rotational position is represented as $\theta[°]$, and the number of the engaged portions is represented as N, and the control device determines the wheel torque direction on the basis of a remainder of a division of $\theta$ by (360/N).

8. The vehicle drive device according to claim 7, wherein the backlash is set so as to be greater than an error in an output value of the rotational position sensor.

9. The vehicle drive device according to claim 7, wherein the rotational position sensor is set such that a detected value of a rotational position of the target rotary member is zero at one of the theoretical lock position of N.

* * * * *